(12) United States Patent
Fitzgerald

(10) Patent No.: US 7,260,741 B2
(45) Date of Patent: Aug. 21, 2007

(54) METHOD AND SYSTEM TO DETECT SOFTWARE FAULTS

(75) Inventor: Jeffrey J. Fitzgerald, Amherst, NH (US)

(73) Assignee: Cedar Point Communications, Inc., Derry, NH (US)

( * ) Notice: Subject to any disclaimer, the term of this patent is extended or adjusted under 35 U.S.C. 154(b) by 252 days.

(21) Appl. No.: 09/954,731

(22) Filed: Sep. 18, 2001

(65) Prior Publication Data

US 2003/0056152 A1    Mar. 20, 2003

(51) Int. Cl.
*G06F 11/00*    (2006.01)

(52) U.S. Cl. ............... 714/13; 714/10; 714/11; 714/12

(58) Field of Classification Search ............ 714/38, 714/47, 55, 10–13; 702/186, 187
See application file for complete search history.

(56) References Cited

U.S. PATENT DOCUMENTS

| | | | |
|---|---|---|---|
| 3,783,250 A | 1/1974 | Fletcher et al. | |
| 4,831,512 A * | 5/1989 | Nakai et al. | 709/231 |
| 5,123,089 A | 6/1992 | Beilinski et al. | |
| 5,432,715 A | 7/1995 | Shigematsu et al. | |
| 5,471,631 A | 11/1995 | Beardsley et al. | |
| 5,544,077 A * | 8/1996 | Hershey | 702/58 |
| 5,572,620 A | 11/1996 | Reilly et al. | |
| 5,604,863 A | 2/1997 | Allen et al. | |
| 5,630,046 A | 5/1997 | Loise | |
| 5,983,371 A | 11/1999 | Lord et al. | |
| 6,073,089 A * | 6/2000 | Baker et al. | 702/185 |
| 6,195,768 B1 * | 2/2001 | Green | 714/47 |
| 6,425,093 B1 | 7/2002 | Singh et al. | |
| 6,931,568 B2 | 8/2005 | Abbondanzio et al. | |

* cited by examiner

*Primary Examiner*—Robert Beausoliel
*Assistant Examiner*—Emerson Puente
(74) *Attorney, Agent, or Firm*—Fish & Neave IP Group Ropes & Gray LLP (57) ABSTRACT

The present invention is directed to a system and method for actively auditing a software system to determine the status. The software system includes a plurality of processes executed in an active processor domain. An active message is generated for processing in the active processor domain. Each process receiving the message modifies it by adding an active time indicator to it; thereby creating a modified active message. The status of the active processor domain is determined in response to the modified active message.

13 Claims, 7 Drawing Sheets

METHOD AND SYSTEM TO DETECT SOFTWARE FAULTS

FIELD OF THE INVENTION

The invention relates generally to fault detection in a computer system and more specifically to a method and system for determining software faults within a processor domain.

BACKGROUND OF THE INVENTION

Generally, it is difficult to determine the health and status of software processes in distributed software system due to the complex inter-relationships and distributed nature of the software environment. Typically, fault detection mechanisms in this environment are either very fine-grained for specific errors (e.g., bus errors) or very course-grained for general errors (e.g., protocol timeouts). There are many other fault conditions (e.g., system hangs, priority inversion, scheduler thrashing, and over-burdened queue depths) which are also detrimental to proper system functionality but which are difficult to detect and isolate in distributed software systems.

Figure 1:
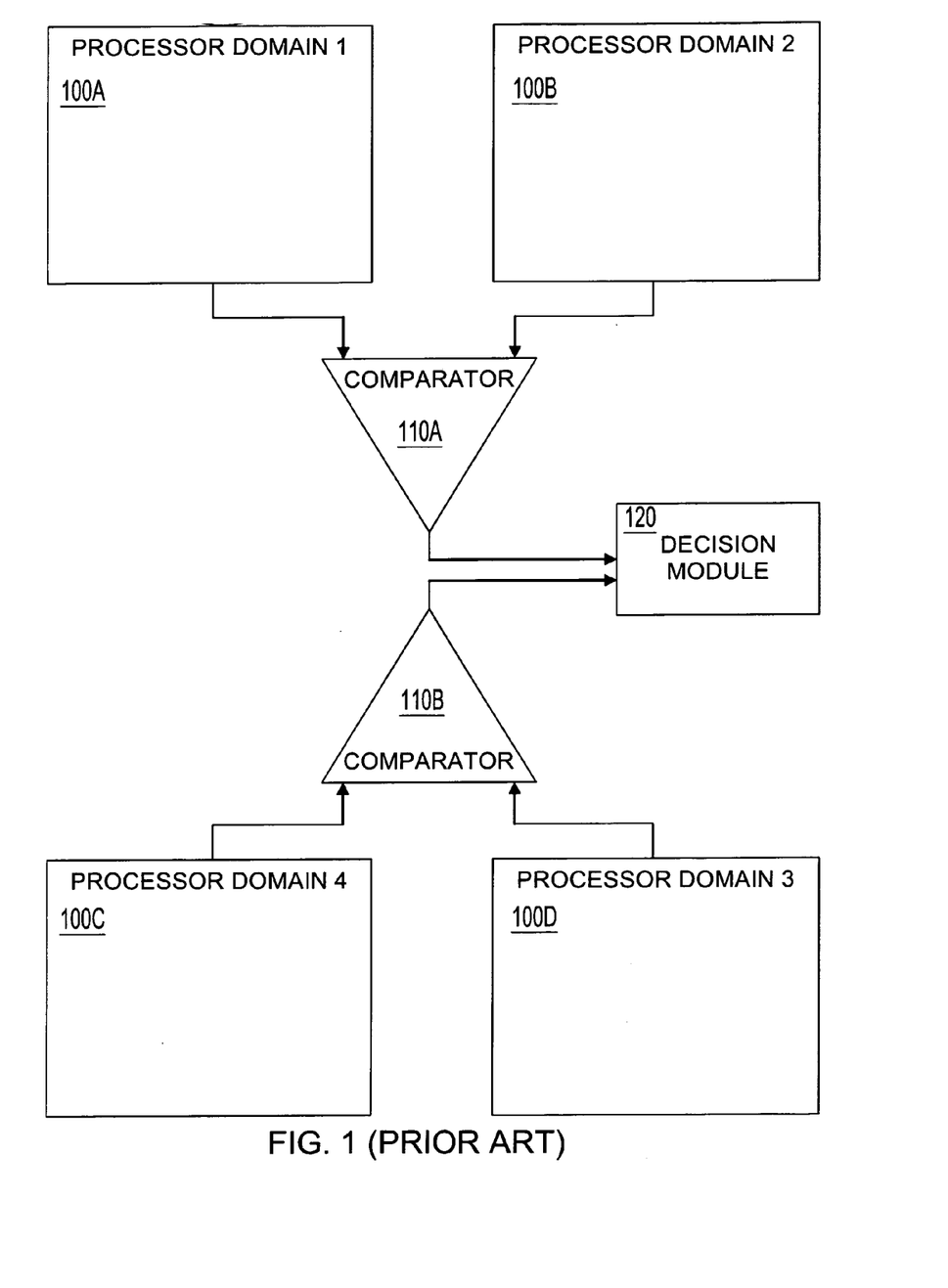
FIG. 1 is a block diagram depicting an embodiment of a prior art redundancy scheme.

Typically, a redundant software system is employed to increase the overall availability of the system. When a software fault is detected in one system the redundant system takes control of the system operations. Generally, three redundancy models are used that vary in cost and complexity. A first model, depicted in FIG. 1, includes four processor domains 100a, 100b, 100c, 100d (referred to generally as 100), grouped into two pairs. Each pair communicates with its own non-redundant comparator function 110a, 110b (referred to generally as 110) that checks the output from each pair separately in a synchronous fashion. Each processor element in each of the processor domains 100 of the pair should generate the same result (the same software is operating with the same data). When a comparator function 110 determines mismatch in any result, the other pair of processor domains 100 take over. If the comparator function 110 fails, the other pair of processor domains 100 takes over. Thus both the active processor domains 100 and comparator function 110 are protected from single points of failures.

Figure 2:
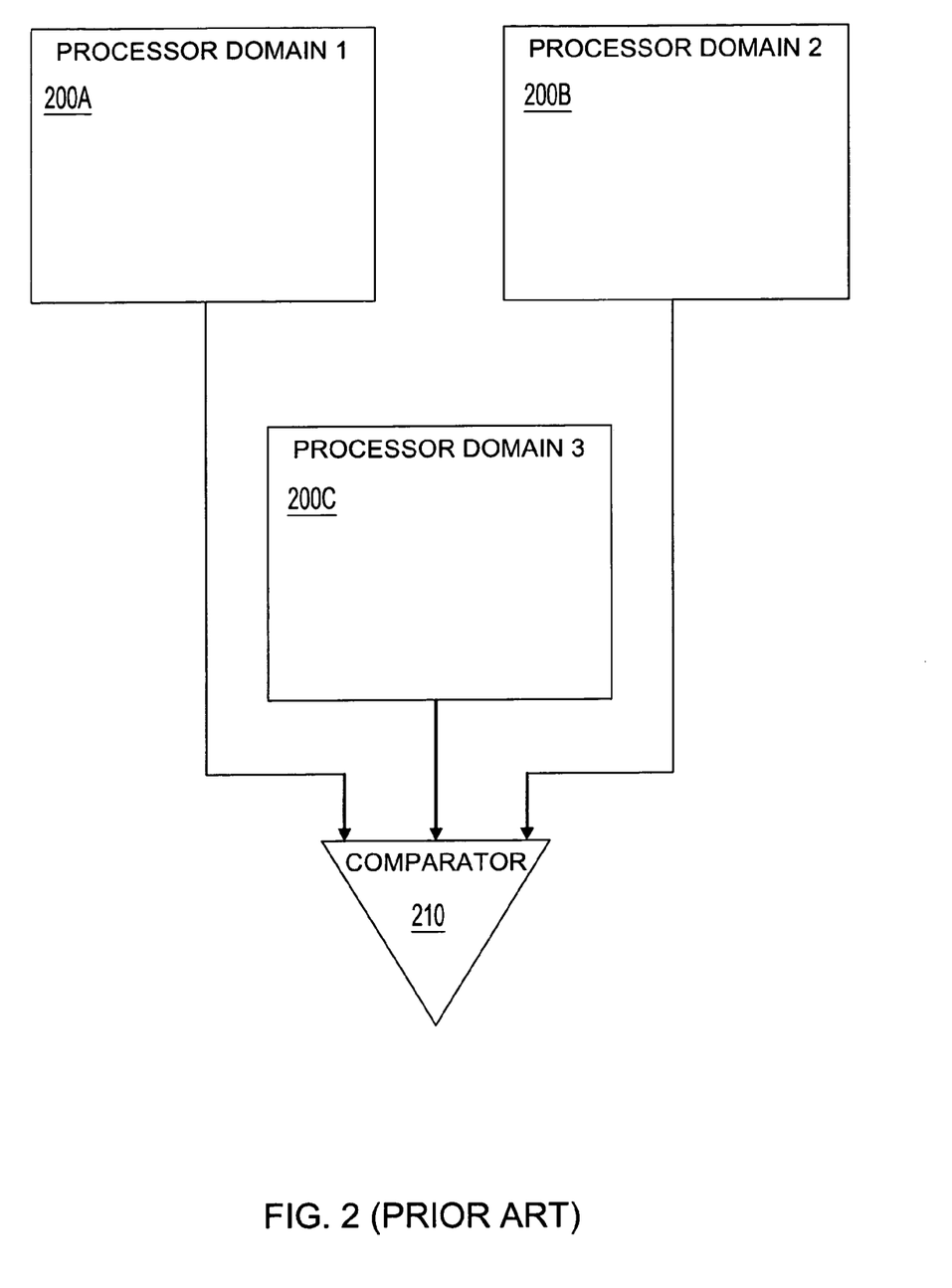
FIG. 2 is a block diagram of another embodiment of a prior art redundancy scheme.

With reference to FIG. 2, a second redundancy model includes three processor domains 200a, 200b and 200c (referred to generally as 200). The model runs as a single lockstep entity (i.e., each processor domain runs the same code and receives the same data). A comparator function 210 compares the output of all three processor domains 200. If the results of one of the processor domains disagrees with the results of the other two processor domains, that processor domain 200 is declared faulty and it is taken out of service. If the comparator 210 fails then one processor domain is taken out of service, but the other two processor domains remain in service.

The third typical redundancy model includes two processors domains, one active and one stand-by. The processor domains may be running in lockstep or the stand-by processor domain could constantly be updated by state messages from the active processor domain. There is no comparator function because there is no way to determine which processor domain is functioning correctly. Thus, failure is "self-determined" within a processor domain by running a low-level "heartbeat" function or relying on system traps (e.g., bus error timeouts). This model is generally less expensive than the other redundancy models mentioned above. However, the ability to isolate faults is reduced because of the lack of hardware comparator redundancy.

What is needed is a redundancy scheme capable of providing high availability with an increased sensitivity to process faults within a processor domain.

SUMMARY OF THE INVENTION

The present invention is directed to providing a highly available redundancy scheme sensitive to individual process faults within a processor domain. A message is provided to processes in a processor domain in a "daisy-chained" fashion and each process time-stamps the message and passes it on to the next process in a list. The list is included in the message and represents all the processes within the given processor domain that will receive the message. The same method is implemented in a redundant (stand-by)processor domain. Once the messages have been time-stamped by all the processes, the time-stamped messages are communicated to a separate processor domain that verifies the time-stamped process list as correct, thereby determining the health and correctness of the audited processor domains.

One aspect of the present invention is directed to a method of actively auditing a software system to determine the status. The software system includes a plurality of processes executed in an active processor domain. The method includes the steps of generating an active message to be processed by the active processor domain, generating a modified active message by providing an active time indicator associated with the active message for at least one of the processes of the plurality, and determining the status of the active processor domain in response to the modified active message.

In one embodiment, the status of the active processor domain is determined in response to the active time indicator. In another embodiment, the active time indicator includes a time-stamp indicating the time that the at least one process completed processing the active message. In an alternate embodiment, the time-stamp indicates the time elapsed while the at least one process completed processing the active message.

In another embodiment, the method includes the steps of determining a statistical characteristic of the active processor domain, and determining the status of the active processor domain in response to the statistical characteristic. In a further embodiment, the step of determining a statistical characteristic includes generating a time average of the duration of the at least one process of the plurality of processes for a plurality of active messages. In still a further embodiment, the step of determining a statistical characteristic includes generating a standard deviation from the time average.

In another embodiment, the method includes the steps of generating a stand-by message to be processed in a stand-by processor domain that includes a plurality of stand-by processes, and generating a modified stand-by message by providing a stand-by time indicator for at least one process of the plurality of stand-by processes in the stand-by domain. In a further embodiment, the method includes the step transforming the active processor domain to the stand-by processor domain in response to the modified active message.

Another aspect of the present invention is directed to a system for actively auditing a software system to determine status. The system includes an active processor domain, a time-stamp mechanism and a redundancy manager. The active processor domain has at least one processor executing at least on process that receives an active message and generates a modified active message in response. The time-stamp mechanism is in communication with the at least one process and provides an active time indicator for use in generation of the modified active message. The redundancy manager is in communication with the active processor domain and determines the status of the active processor domain in response to the modified active message.

In one embodiment, the system includes a stand-by processor domain. The stand-by processor domain includes at least one processor executing at least one stand-by process that receives a stand-by message and generates a modified stand-by message in response. In this embodiment, the redundancy manager determines the status of the stand-by processor domain in response to the modified stand-by message. In a further embodiment, the system includes a control determination module that transforms the active processor domain into the stand-by processor domain in response to the modified active message.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 3A:
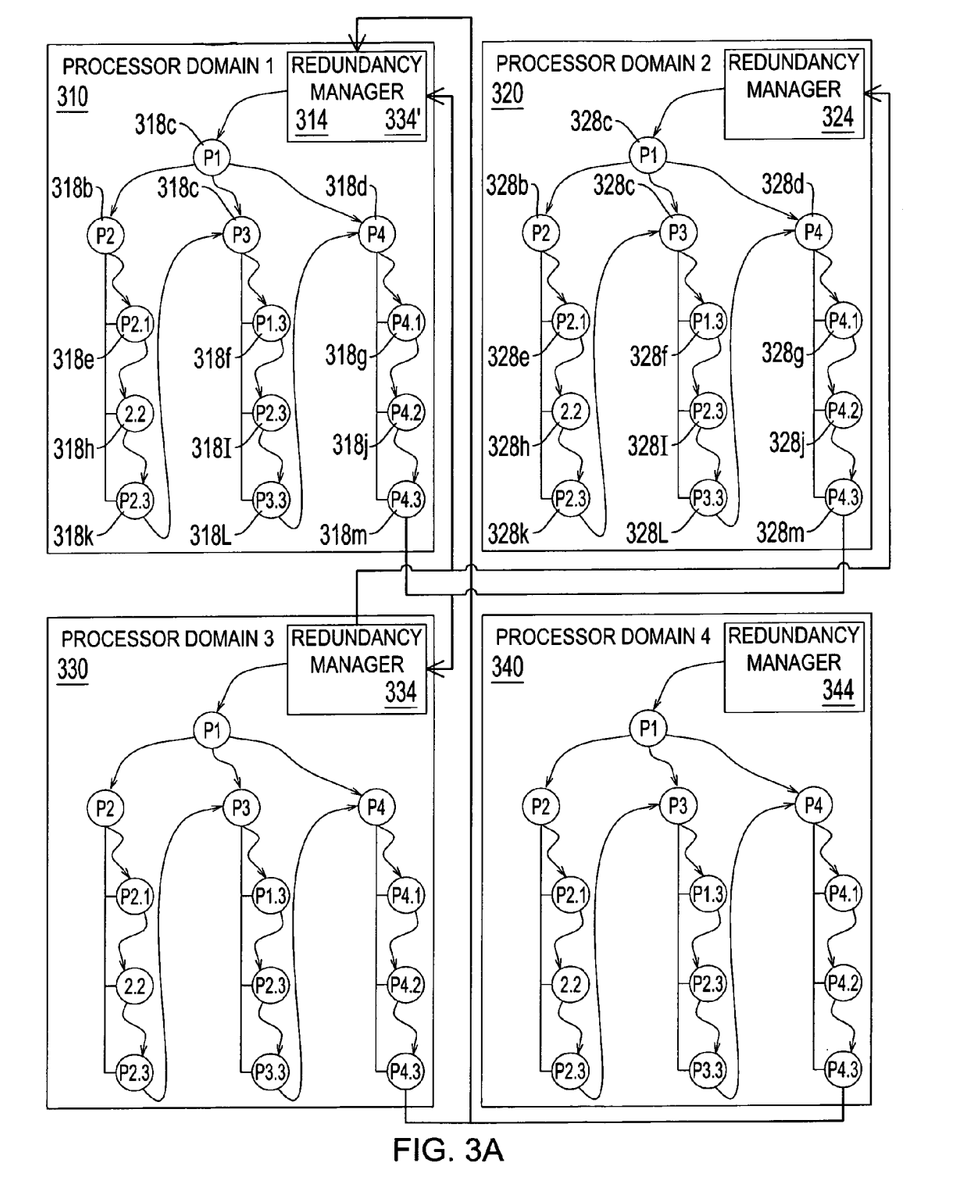
FIG. 3A is a block diagram of an embodiment of software audit system constructed in accordance with the present invention.

With reference to FIG. 3A, one embodiment of the present invention includes an active processor domain 310 including an active redundancy manager 314 and a plurality of active processes 318a, 318b, 318c . . . 318x (referred to generally a 318), a redundant processor domain 320 including a redundant redundancy manager 324 and a plurality of redundant processes 328a, 328b, 328c . . . 328x (referred to generally a 328), and a voting processor domain 330 including a voting redundancy manger 334.

In operation, active processor domain 310 is fully active (i.e., performing system functions). Active redundancy manger 314 generates an active message. The active message includes a list of the plurality of active processes 318 that will receive the active message and the location of the voting redundancy manager 334. The active message is communicated to the first active process 318, more specifically in this illustrative example active process 318a. Active process 318a receives the active message and in response time-stamps the message to generate a modified active message and communicates it to the next active process 318b. This process continues until the final active process in the list receives the modified active message and time-stamps it. Upon completion of processing the modified active message by the last active process 318m, the modified active message is communicated to the voting redundancy manager 334. In a preferred embodiment, the time-stamp includes the time the active message was received by an active process 318. In an alternative embodiment, the time-stamp includes the time an active process 318 completes the processing of the active message. In yet another embodiment, the time-stamp includes the time elapsed while the active process 318 completed processing the active message.

Generally, redundancy processor domain 304 mirrors (i.e., contains the same processes as) active processor domain 310. Redundant processor domain 320 tracks the state of active processor domain 310, thus the processing load of the redundant processor domain 320 is significantly less than that of active processor domain 310. Similar to active redundancy manager 314, redundant redundancy manger 324 generates a redundant message. The redundant message includes a list of which of the plurality of redundant process 328 that will receive the redundant message and the location of the voting redundancy manager 334. The redundant message is communicated to the first redundant processes 328, more specifically in this illustrative example redundant process 328a. Redundant process 328a receives the redundant message and in response time-stamps the message to generate a modified redundant message and communicates it to the next redundant process 328b. This process continues until the final redundant process in the list receives the modified redundant message and time-stamps it. Upon completion of processing the modified redundant message by the last redundant process 328m, the modified redundant message is communicated to the voting redundancy manager 334. In another embodiment, redundant processor domain 314 does not mirror active processor domain 310. Additionally, redundant processor domain 320 and active processor domain 310 do not have to have synchronized time measurement means.

Voting redundancy manager 334 receives both the modified active message and the modified redundant message. Voting redundancy manager 334 logs the received messages and generates a statistical characteristic for the modified active message and the modified redundant message. In one embodiment, the statistical characteristic includes a running mean of the time need to complete the active software audit and a standard deviation therefrom. If the standard deviation determined for the modified active message exceeds a predetermined threshold value (e.g., 2 standard deviations), voting redundancy manger 334 instructs the redundant processor domain 320 to become the fully active (i.e., an active processor domain). Consequently, active processor domain 310 is instructed to transition to a second state and function as a redundant processor domain. The voting function performed by voting processor domain 330 requires a small amount of processing time and thus does not place a large burden on the overall processing resources of the voting processor domain 330. As a result, active redundancy manager 314 can also function as a voting redundancy manager 334' for voting processor domain 330 and a fourth processor domain 340.

Figure 3B:
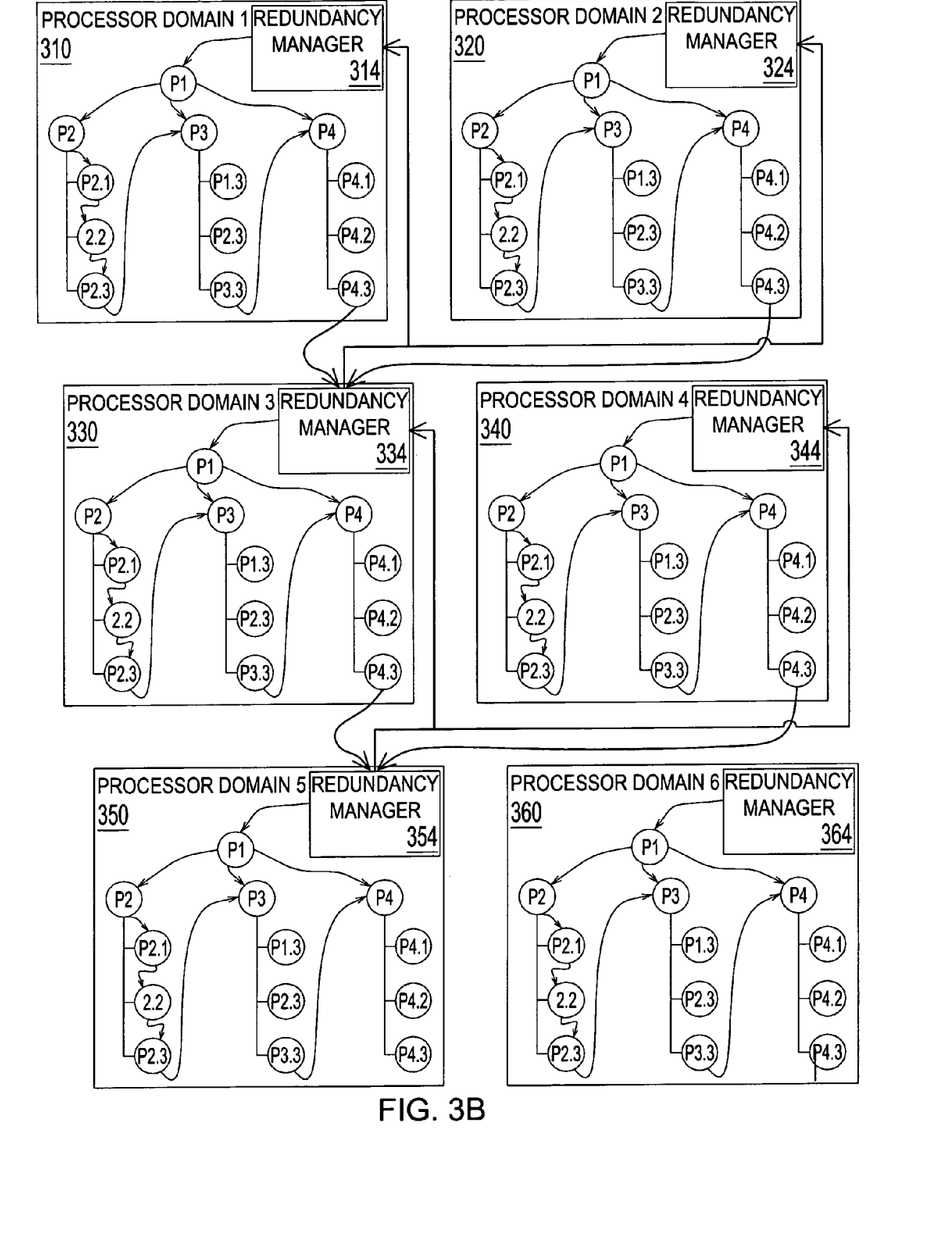
FIG. 3B is a block diagram of another embodiment of software audit system constructed in accordance with the present invention.

FIG. 3B depicts an embodiment of the present invention in which six processor domains are being audited for faults. In this embodiment, a redundancy manager 334 of a third processor domain 330 performs the voting function for a first processor domain 310 and a second processor domain 320. Additionally, a redundancy manager 354 of a fifth processor domain 350 performs the voting function for the third processor domain 330 and a forth processor domain 340. As shown, one can see that this method can be extended to any number of processor domains and is not limited to the above-described illustrative embodiments.

In addition to determining if the processor domain contains a faulted process, the present invention provides the ability to isolate which process or processes in the processor domains have faulted. By subtracting the time-stamp from a process in the list and the previous process in the list, the elapsed time needed for the process to complete the time-stamping function can be determined and logged each time the software audit is performed. Voting redundancy manager 334 generates a running average for each process in the processor domains, and also a standard deviation from the running average for each process in the current audit. If the standard deviation for a process exceeds a predetermined threshold (e.g., two standard deviations), the process is determined to have faulted. This information can be stored or communicated for use in restoring the faulted processor domain to a non-faulty state.

Figure 4:
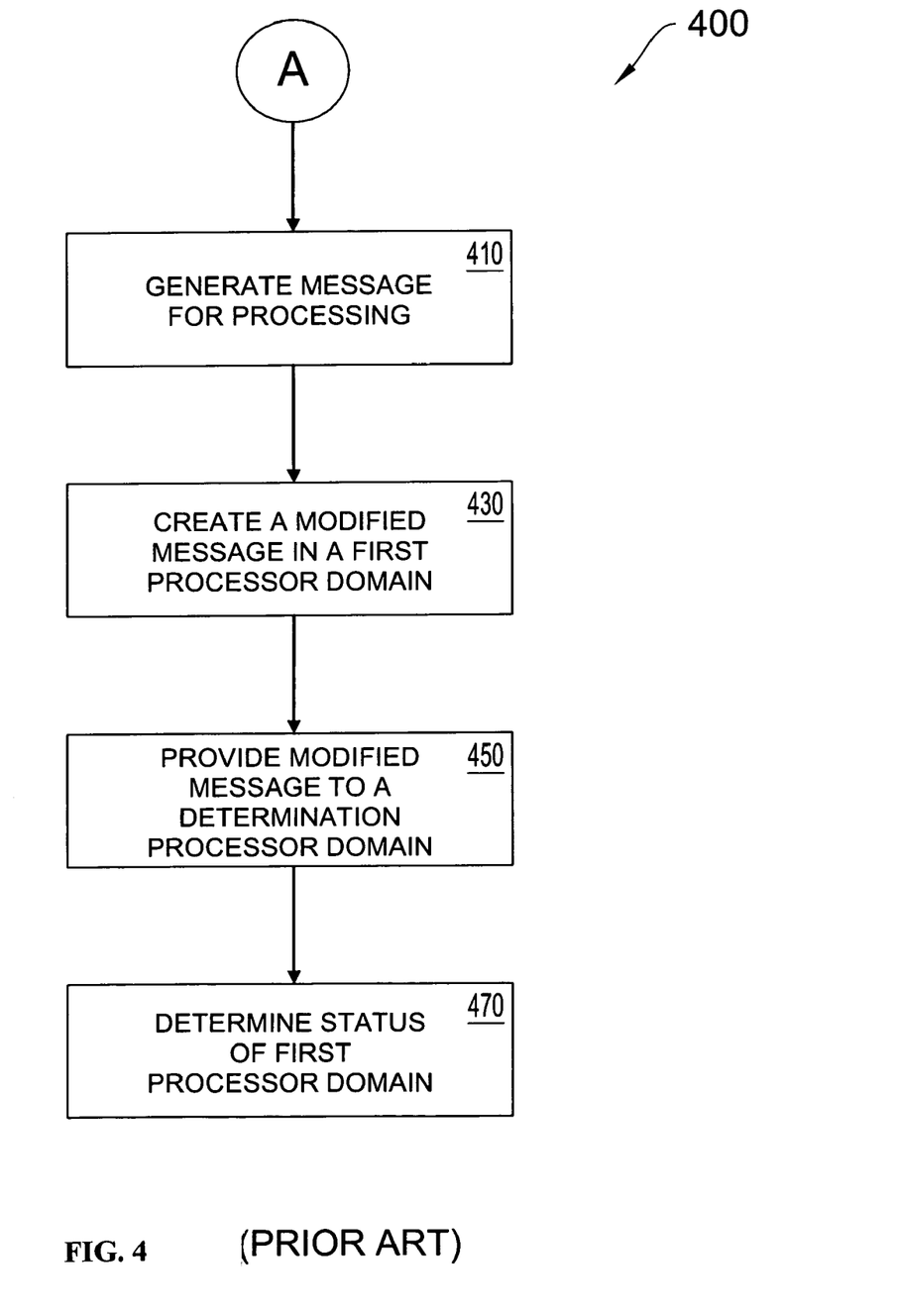
FIG. 4 is a flow chart representation of an embodiment of a method of the present invention.

With reference to FIG. 4, one embodiment of the present invention relates to a method 400 of actively auditing a software system to determine its status. In step 410, a message is generated for processing by a first processing domain. In one embodiment, the message includes a list of all the processes that will receive the message and process it. In step 430, a modified message is created by a process in the first processor domain. After each process in the list has attempted to modify the message, the modified active message is provided to a determination processor domain in step 450. The determination processor domain is separate from the first processor domain and determines the status of the first processor domain in response to the modified active message in step 470.

Figure 5:
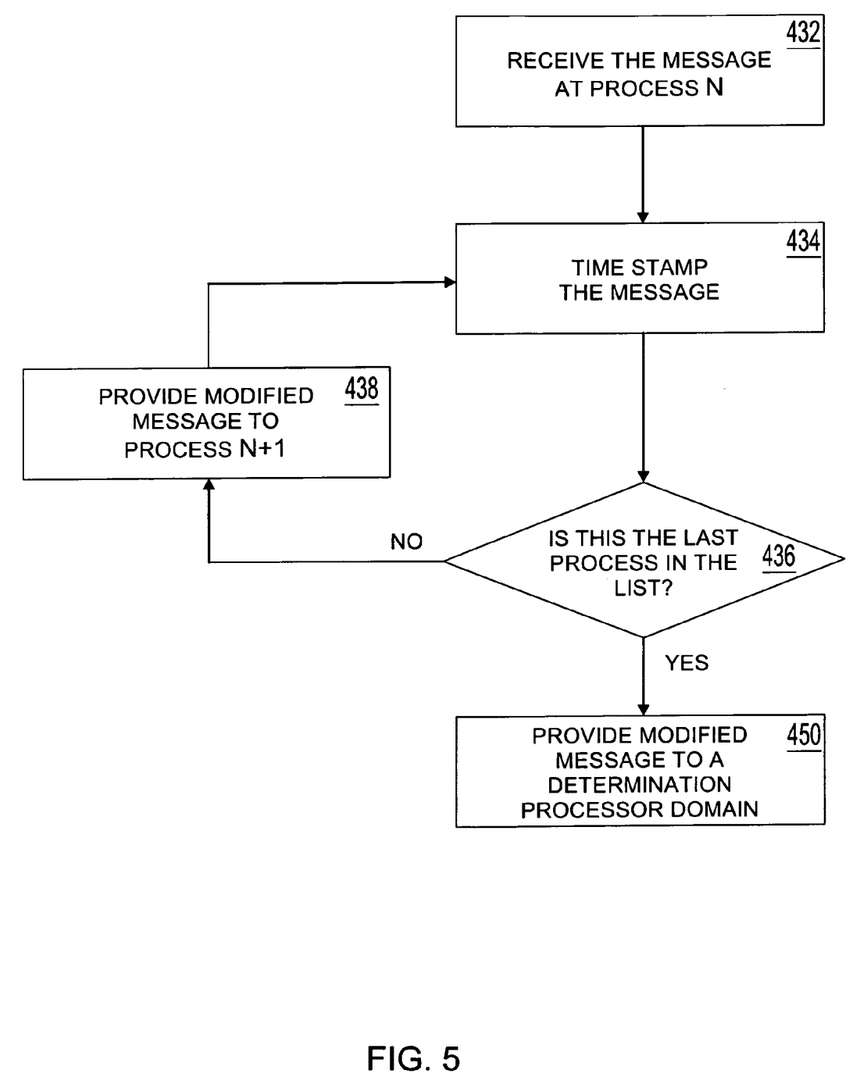
FIG. 5 is a flow chart representation of an embodiment of a method step of the present invention.

With reference to FIG. 5, the creating of a modified active message in step 430 of method 400 includes, in more detail step 432, receiving the message by a first process (N) of a plurality of processes running in the first processor domain. The message is time-stamped in step 434 by process N. In one embodiment, if process N is not running or has faulted in another manner, an error message is added to the active message in place of the time-stamp. After the message is modified, a decision is made in step 436 to determine if process N is the last process in the list of processes to receive the message. If process N is not the last process on the list, the method proceeds to step 438 and the message is provide to process N+1, (i.e., the next process in the list) and the time-stamping step 434 is repeated. Once the list process in the list is reached, the modified active message is provided to the determination processor domain in step 450.

Figure 6:
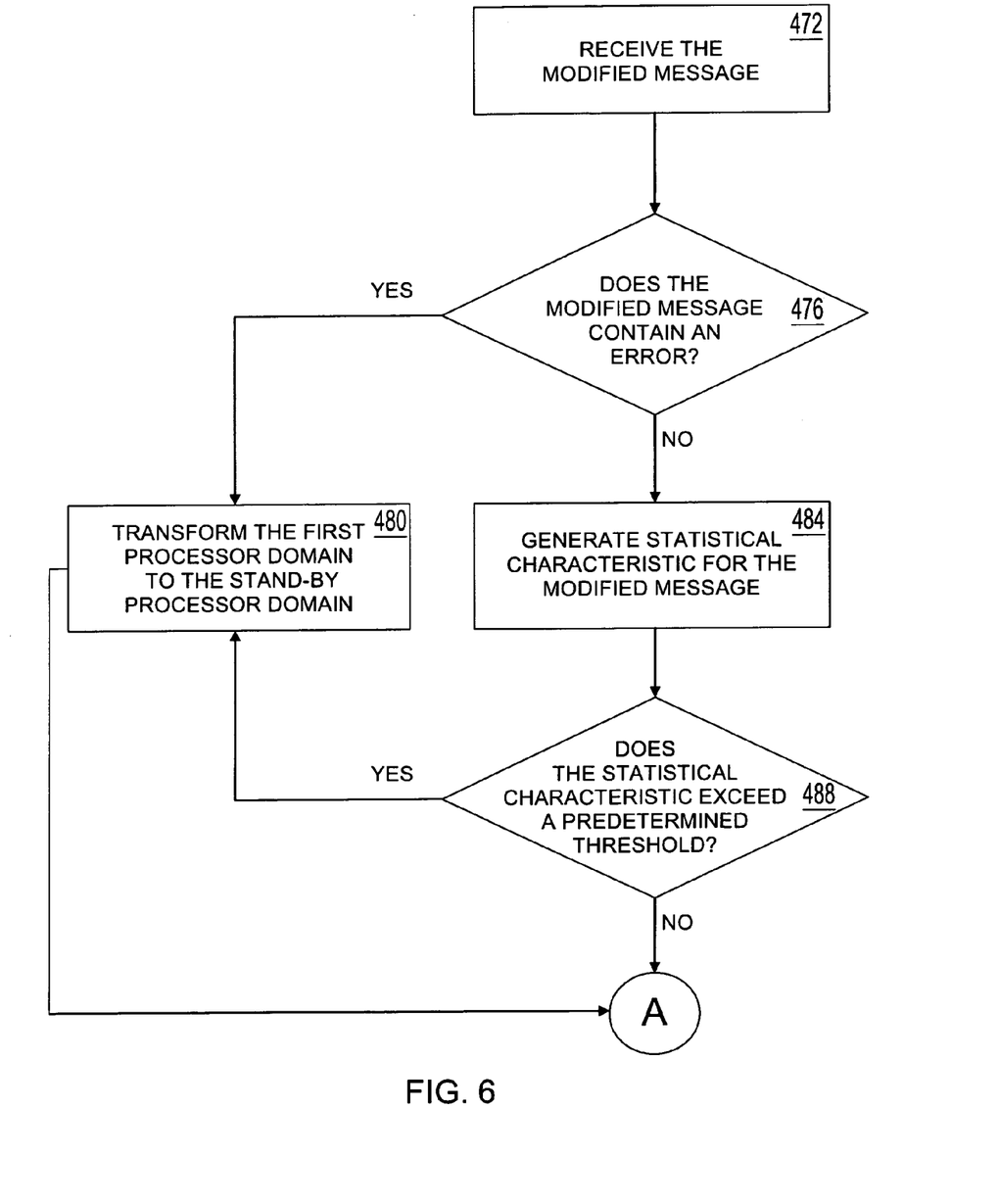
FIG. 6 is a flow chart representation of an embodiment of a method step of the present invention.

With reference to FIG. 6, in more detail step 470, determining the status of the first (active) processor domain, includes receiving the modified message by the determination domain in step 472. Step 476 determines whether or not the modified active message contains an error message. If an error message is present, the method proceeds to step 480 and the first processor domain is transformed into a stand-by processor domain, and the stand-by processor domain is transformed into an active processor domain. If an error message is not present in the modified message, the method continues to step 484 and a statistical characteristic of the modified message is generated. The statistical characteristic is analyzed to determine if it exceeds a predetermined threshold in step 488. If the statistical characteristic exceeds the predetermined threshold, the method proceeds to step 480 and the first processor domain is transformed into a stand-by processor domain, and the stand-by processor domain is transformed into an active processor domain. If the statistical characteristic does not exceed the predetermined threshold then method 400 is repeated. In one embodiment, this method is repeated about once per second, although other periods of repetition are possible without departing from the spirit and scope of the present invention.

Having shown the preferred embodiments, one skilled in the art will realize that many variations are possible within the scope and spirit of the claimed invention. It is therefore the intention to limit the invention only by the scope of the claims.

What is claimed is:

1. A method of enhancing fault tolerance of a software system, the software system comprising a plurality of active processes executed in an active processor domain, the method comprising the steps of:
   generating an active message having a list of the plurality of active processes that are to receive the active message for processing by the active processor domain;
   generating a modified active message by providing an active time indicator associated with the active message for each of the plurality of active processes;
   generating a stand-by message for processing in a stand-by processor domain, the stand-by processor domain comprising a plurality of stand-by processes;
   generating a modified stand-by message by providing a stand-by time indicator for each of the plurality of stand-by processes in the stand-by domain;
   generating a statistical characteristic for the modified active message; and
   based on the statistical characteristic, interchanging the stand-by processor domain with the active processor domain.

2. The method of claim 1 further comprising the step of determining a status of the active processor domain in response to the active time indicator.

3. The method of claim 2 wherein a respective active time indicator is associated with each process of the plurality of processes, and wherein the step of determining the status of the active processor domain is responsive to more than one of the active time indicators.

4. The method of claim 1 wherein the active time indicator comprises a time-stamp indicating the time the at least one process completed processing the active message.

5. The method of claim 1 wherein the active time indicator comprises a time-stamp indicating the time elapsed while the at least one process processed the active message.

6. The method of claim 1 wherein the step of determining the statistical characteristic comprises generating a time average of the duration of the at least one process of the plurality of processes for a plurality of active messages.

7. The method of claim 6 wherein the step of determining statistical characteristic comprises generating a standard deviation from the time average.

8. The method of claim 1, further comprising the step of determining a status of the stand-by processor domain in response to the stand-by time indicator.

9. The method of claim 8 wherein a respective stand-by time indicator is associated with each process of the plurality of stand-by processes of the stand-by domain and wherein the step of determining the status of the stand-by processor domain is responsive to at least two of the stand-by time indicators.

10. The method of claim 1, including the further step of forwarding the active message to the active processes on the list, to allow respective active processes to generate the modified active message.

11. The method of claim 1, wherein interchanging the stand-by processor domain with the active processor domain based on the statistical characteristic, includes comparing the statistical characteristic to a predetermined threshold value.

12. The method of claim 1, wherein interchanging the stand-by processor domain with the active processor domain based on the statistical characteristic, includes comparing the statistical characteristic generated for the active processor to the statistical characteristic generated for the stand-by processor.

13. A method of enhancing fault tolerance of a software system, the software system comprising a plurality of active processes executed in an active processor domain, the method comprising the steps of:

generating an active message for processing by the active processor domain;

generating a modified active message by providing an active time indicator associated with the active message for each of the plurality of active processes;

generating a stand-by message for processing in a stand-by processor domain, the stand-by processor domain comprising a plurality of stand-by processes;

generating a modified stand-by message by providing a stand-by time indicator for each of the plurality of stand-by processes in the stand-by domain;

generating a statistical characteristic for the modified active message; and based on the statistical characteristic, interchanging the stand-by processor domain with the active processor domain;

wherein interchanging the stand-by processor domain with the active processor domain based on the statistical characteristic, includes comparing the statistical characteristic generated for the active processor to the statistical characteristic generated for the stand-by processor.

* * * * *